Dec. 27, 1938.   H. C. LORD   2,141,956
RAIL CAR
Filed Nov. 13, 1934   4 Sheets-Sheet 1
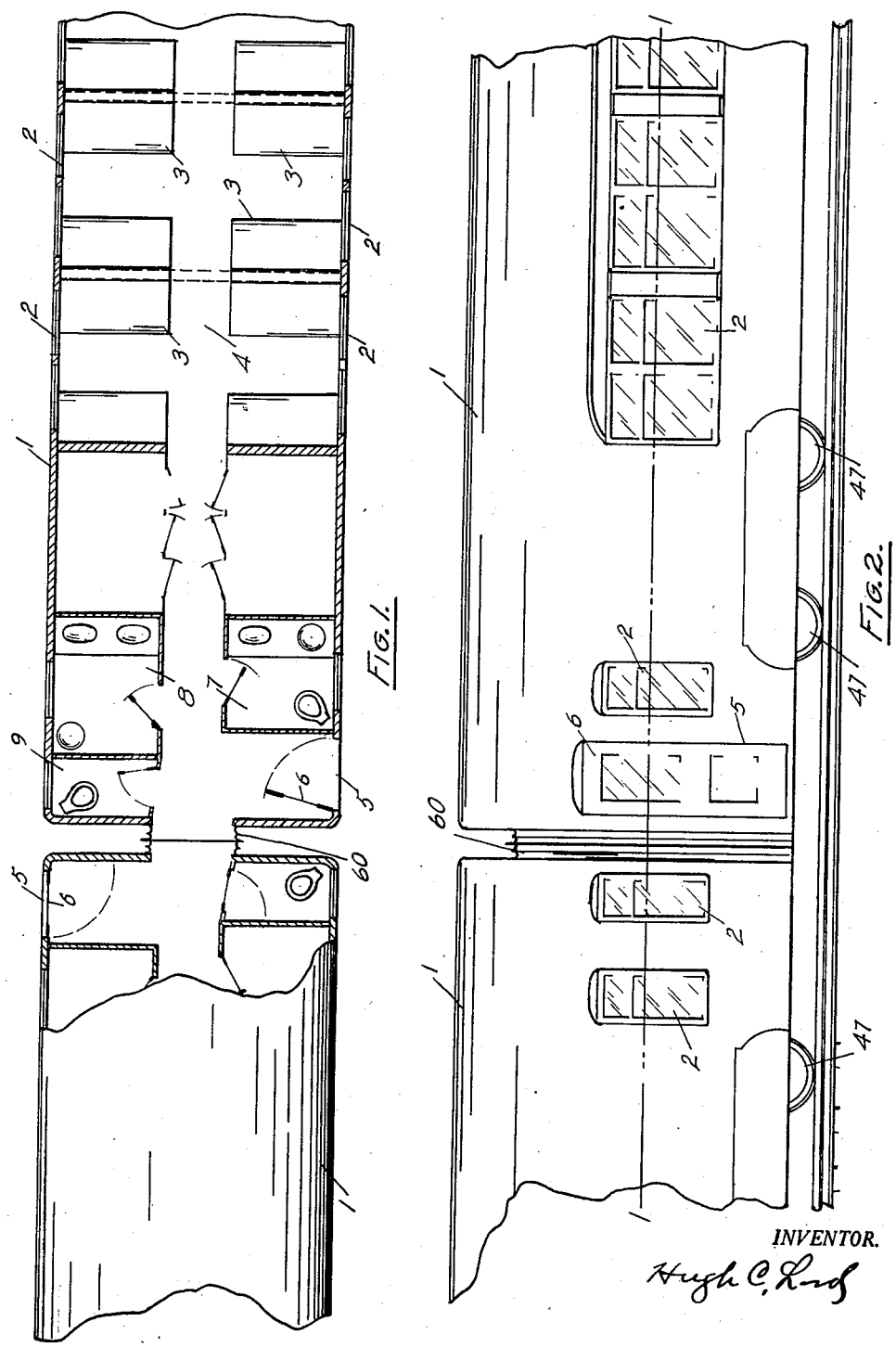
INVENTOR.
Hugh C. Lord Dec. 27, 1938.  H. C. LORD  2,141,956
RAIL CAR
Filed Nov. 13, 1934    4 Sheets-Sheet 2

INVENTOR.
Hugh C. Lord

Dec. 27, 1938.  H. C. LORD  2,141,956
RAIL CAR
Filed Nov. 13, 1934  4 Sheets-Sheet 3

INVENTOR.
Hugh C. Lord

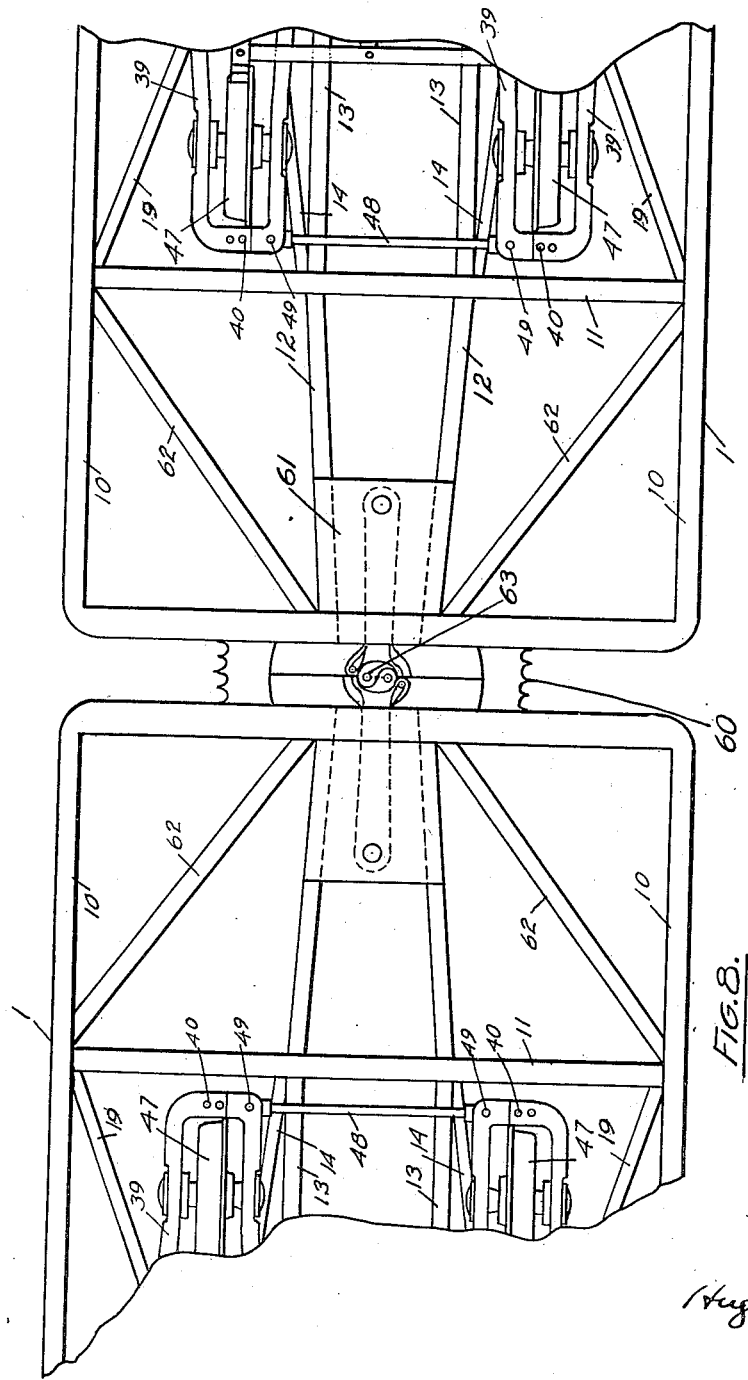

Patented Dec. 27, 1938

2,141,956

UNITED STATES PATENT OFFICE 2,141,956

RAIL CAR

Hugh C. Lord, Erie, Pa.

Application November 13, 1934, Serial No. 752,847

27 Claims. (Cl. 105—158)

This invention relates to an improvement in vehicles, particularly railroad cars which are ordinarily handled in trains.

In carrying out the invention the car is mounted on trucks, each mounted on wheels at one side only of the car. Preferably each truck carries two wheels and each car is provided with four trucks. This arrangement of trucks and the separation of the wheels operating on one rail from those of the other provides for free-running of all the wheels, regardless of curves, or speed, or side sloping of the tracks.

Each of these trucks is independently swiveled to accommodate the curves of the track and the springing of the trucks is preferably arranged at, or adjacent to the axis of the swivel connection. Preferably the cushioning is accomplished by rubber and in the example embodiment of my invention here shown it is so arranged. This not only cushions the truck, but sound-proofs the truck from the car. The cushion preferably also accommodates some, if not all, of the swiveling action of the truck at the joint.

One of the important features of the invention is that with the formation of truck it is possible to drop the floor level of the car to a very short distance above the rail level, thus very materially lowering the center of gravity of the car and obviating very largely the necessity for steps leading to and from the car. In dropping this floor level and with this arrangement of trucks the aisles may be continued entirely through the car at the low level so that one car may be connected to another.

The invention also contemplates a driving connection at the axis of the truck. This driving connection may be used for connecting the wheels with a generator, or for connecting a motor with the wheels.

Features and details of the invention will appear from the specification and claims.

A preferred embodiment of the invention is illustrated in the accompanying drawings as follows:—

Fig. 1 shows a horizontal section on the line 1—1 in Fig. 2.

Fig. 2 is a side elevation of the joined ends of two cars.

Figure 3:
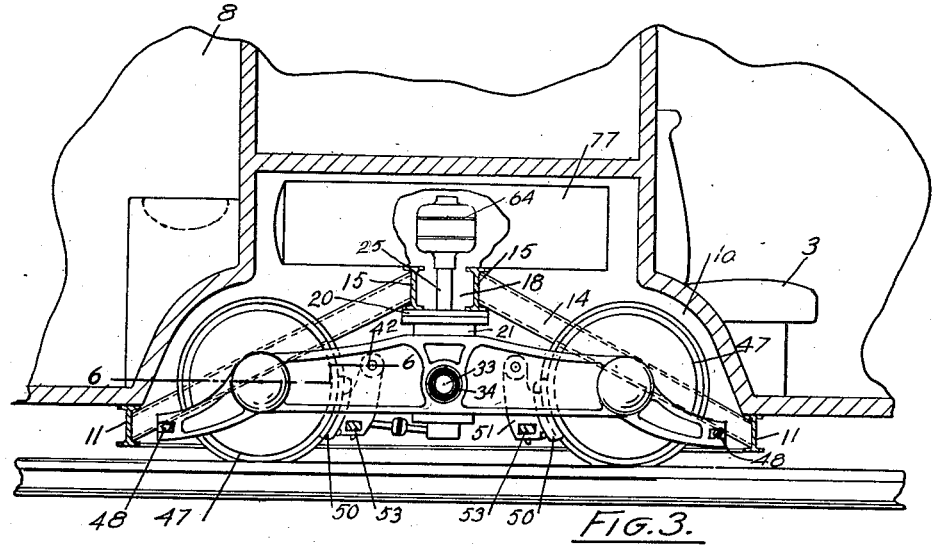
Figure 4:
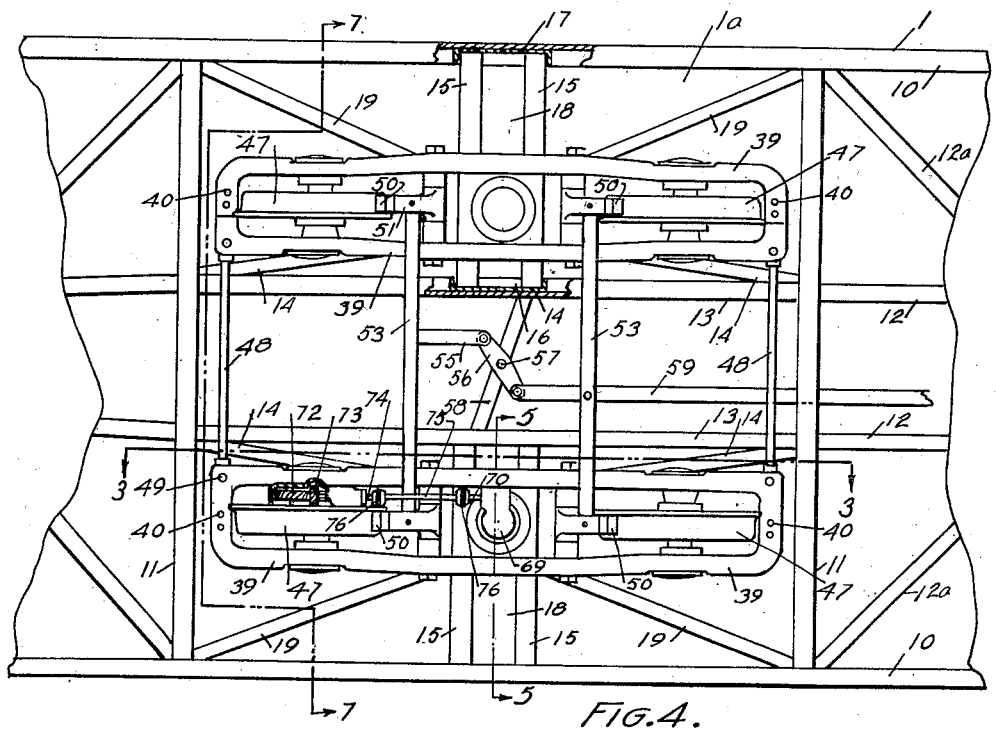

Fig. 3 a vertical section on the line 3—3 in Fig. 4.

Fig. 4 a bottom view of the trucks with the superimposed portion of the car.

Figures 5, 6, 7:
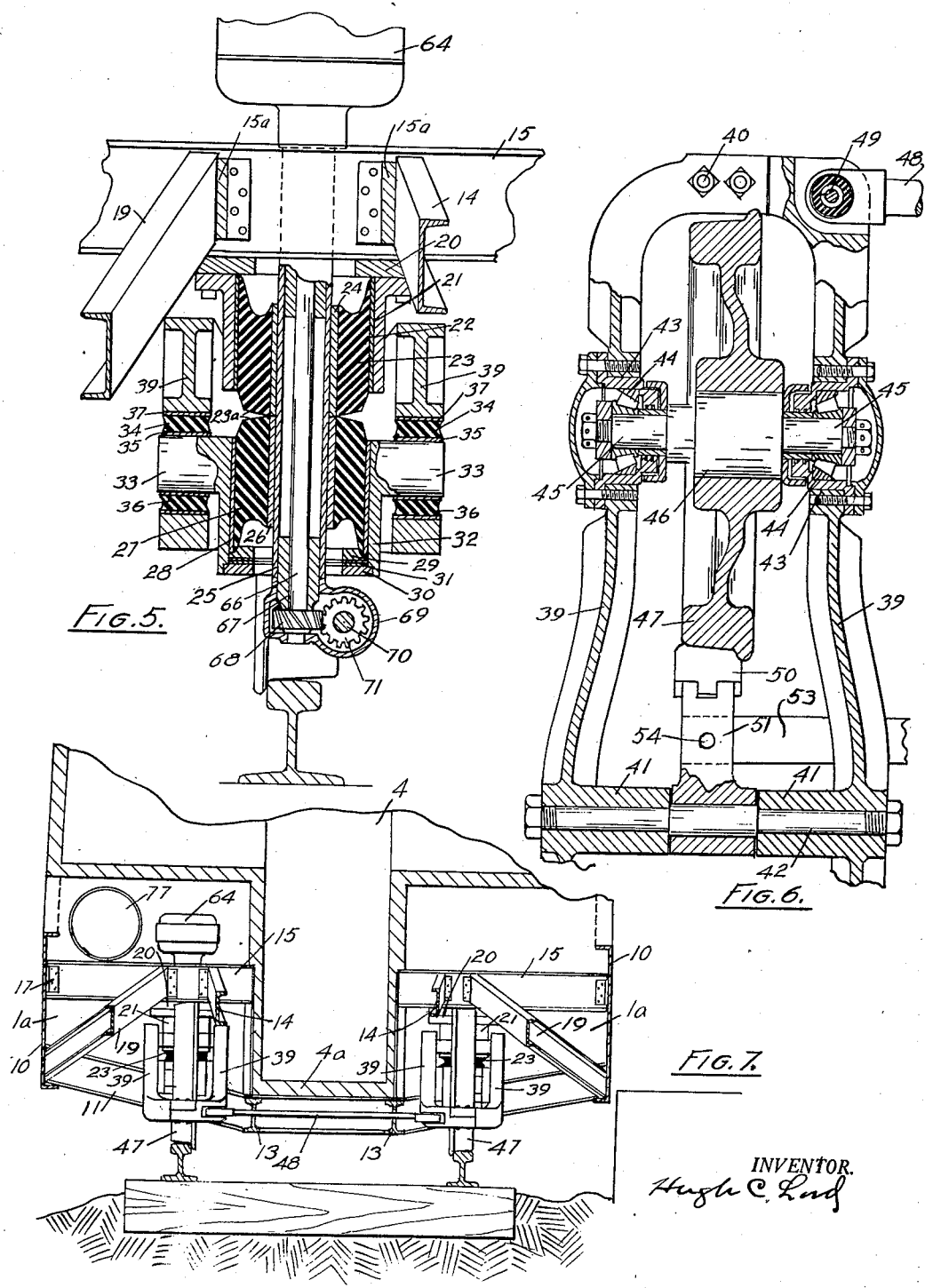

Fig. 5 is a section on the line 5—5 in Fig. 4.

Fig. 6 a section in the line 6—6 in Fig. 3.

Fig. 7 is a section on the line 7—7 in Fig. 4,

Fig. 8 is a bottom view, showing the framing with the draw heads and couplers.

1 marks the car body which forms a covered enclosure, 2 the windows, 3 the seats which may involve berths, if desired, 4 an aisle through the car, 5 the entrance to the car, and 6 a door closing the entrance. It will be noted that the entrance at opposite ends is at opposite sides. 7, 8 and 9 indicate toilet and wash rooms.

Main girders 10 of the car frames are arranged at the sides and can be made of a width extending to the window sill, if desired. These girders are braced vertically by the joining of the car sides over the top, as shown. These are connected by cross pieces 11. These cross pieces are bent up slightly at the ends, as clearly shown in Fig. 7, so as to give the necessary clearance involved in railroad regulation. Lengthwise beams 12 are provided and suitable braces 12a are also provided for securing floors 4a which extend from side to side of the car and throughout the length of the car at the aisle. At each end of the car a truck space 1a is provided. Lengthwise girders 13 somewhat heavier than the lengthwise girders 12 connect the adjacent cross pieces 11 which may be slightly heavier than the cross pieces through the center of the car. Struts 14 extend from the ends of the girders 13 and are connected with cross supporting beams 15 extending each side of the aisle. These cross supporting beams are connected at each end by plates 16 and 17 and are separated leaving a space 18 between them. The plates 17 are secured to the main girders 10. The cross beams 15 are braced with the side girders 10 by braces 19 and at the point of juncture of the braces 19 with the beams 15 there is secured a truck carrying plate 20, the cross beams 15 at this point being fixed by cross plates 15a. A joint socket 21 is bolted to the plate 20 and the outer shell 22 of a cushion joint is pressed into the joint socket 21. The joint has an annular rubber cushion 23 with an inner joint member 24, the rubber forming this joint being preferably bonded at its inner and outer surfaces to the shell 22 and the member 24 as the rubber is vulcanized. Thus the rubber in shrinking is put under tension and being arranged in a vertical direction sustains the load of the car in shear. The inner joint member 24 is secured on a sleeve 25 which extends through an inner joint member 26 of a lower joint. This lower joint has a rubber element 27 and an outer shell 28 and is similar in construction with the upper joint. Both of these joints at their meeting end have snubbing ends 23a which extend beyond the shells 22 and 28 and under abnormal load these ends come together, thus increasing to a very great extent the flexing resistance of the joints. The rubber at each end is also cupped to provide a free space for the working of the joint. A wear plate 29 is secured to the lower end of the shell 28 and rests on a flanged wear plate 30, washers 31 being interposed between the wear surfaces. The plate 30 is secured to a sleeve 32. The sleeve 32 is preferably journaled on the outer shell of the joint and is provided with trunnions 33 extending inwardly and outwardly from the sleeve. Rubber joints 34 are arranged on the trunnions, these joints having an inner member 35 fixed on the trunnions, a rubber element 36 bonded to the member 35 and an outer shell 37 bonded to the rubber. The outer shells of the inside and outside trunnions are fixed in truck sides 39. These truck sides are joined at each end by bolts 40 and intermediate their ends have abutting projections 41 through which extend bolts 42, thus connecting the truck sides.

Each end of the truck sides is provided with bearing openings 43 in which are secured roller bearing assemblies 44. These assemblies are in turn secured to ends 45 of a wheel axle 46. A wheel 47 is secured on each axle so that there is provided at each end of the truck a wheel support. The trucks at each side of the car are connected by a rod 48, this rod being pivotally connected to each truck by pivot bolts 49 so that the trucks at both sides of the car are compelled to swing together, but the wheels at each side of the car operate independently and consequently there is no sliding of the wheels incident to unequal sizes of wheels, or curves. Brake shoes 50 are carried by brake arms 51 and these are pivotally mounted on the bolts 42 extending from side to side of the truck side. Brake beams 53 are pivotally connected by bolts 54 with the brake arms and extend across the car below the car. A link 55 connects one brake beam with a lever 56. The lever 56 is pivoted by means of a joint 57 with a cross member 58 on the car frame. Preferably this joint is formed of rubber to avoid a metallic connection with the car. A pull rod 59 is pivotally connected with the lever 56 and is also connected with a second of the brake beams. This pull rod 59 is handled by the ordinary brake operating mechanism, ordinarily an air brake (not shown). The joined cars are closed by the usual collapsible closing means 60 and the cars are provided with a draw head mechanism 61 which is braced through the longitudinal beams 12 and cross braces, or beams 62 leading to the main girders. Ordinary couplers 63 are provided. A generator 64 is mounted on the upper end of the sleeve 25 and is driven through a shaft 66 extending through the sleeve. The lower end of this shaft extends through a bearing 67 and a helical gear 68 is fixed on the lower end of the shaft. A journal box 69 extends from the bearing 67 and a fore and aft shaft 70 is journaled on the box 69. A helical gear 71 is fixed on the shaft 70 and meshes with the gear 68. A gear 72 is fixed on one of the axles at a side of the truck and this meshes with a gear 73. The gear 73 is fixed on a shaft 74 and the shaft 74 is connected through a propeller shaft 75 with the shaft 70, the propeller shaft being connected with the shafts 74 and 70 by universal slip bearings 76. In this way a driving connection is provided between the wheels and an electric apparatus carried above the truck. As shown the apparatus is arranged as a generator, but this may be reversed by forming the electrical apparatus, as a motor, and driving through a similar mechanism except that the driving connection from the shaft 70, under these conditions, would be duplicated on each wheel. The space above the truck space 1a provides for the generator and also provides for an air tank 77. The remaining space 1b may be utilized for storage space for servicing the car.

With this structure it will be noted that the floor level would be about the level of the lower step of the ordinary railway car and would lead directly from platform levels arranged for such steps; that the center of gravity of the car is much lower than that of the ordinary car; that the separate trucks provide a more flexible track following mechanism than a truck serving both rails and having its wheels tied by connecting axles. The seat level is placed much lower and consequently will be relieved from much of the swaying action although the swaying action will be reduced by reason of the lower center of gravity. This will permit of a very much higher speed without discomfort to the passenger. By carrying the aisles between the separated trucks cars may be formed in trains and connected by aisles on the floor level of the car proper. The toilet arrangements can be arranged at the space between the end of the car and the truck spaces. The under structure of the car can be almost entirely housed and thus the air resistance is very materially reduced. The cushioning at the axes of the trucks saves complications in this cushioning, permits of an easy response to any weaving of the track. By cushioning with rubber and preferably in shear a very low period cushion may be provided which tends to prevent periodic swaying. It also may be utilized to accommodate the turning action of the trucks, but if this resistance tends to be objectionable it may be further accommodated by actually joining the trucks through a journal bearing. In using the rubber cushions preferably a tandem bearing is used which doubles the softness of the bearing without reducing its strength. A connection of one truck with the other is desirable to more definitely guide the trucks with the track and prevent either truck from leaving the track so long as one of the trucks is in guiding relation relatively to its track. By forming a driving connection through the axis of the truck the apparatus driving, or driven, may be spring mounted and arranged in the car, thus more readily housing the apparatus and forming a convenient connection with the wheels.

What I claim as new is:—

1. In a rail car, the combination of a body providing a covered enclosure with a floor; and trucks at the ends of the car having tandem wheels and individually swiveled on the car body on vertical axes at each side of the car body, the floor level of the body being below the tops of the peripheral supporting surfaces of the wheels and the floor level extending between the wheels longitudinally and laterally.

2. In a rail car, the combination of a body providing a covered enclosure with a floor; and trucks at the ends of the car having tandem wheels and individually swiveled on the car body on vertical axes at each side of the car body, the floor level being below the wheel centers and the floor level extending between the wheels longitudinally and laterally.

3. A plurality of rail cars, each car being provided with a body providing a covered enclosure with a floor, said enclosure being provided with passages terminating in end openings in the car; and trucks having tandem wheels and individually swiveled on the body on vertical axes at each side of each car, the floor level of the body of each car being below the tops of the peripheral supporting surfaces of the wheels and the body providing a passage at the floor level between the cars.

4. In a rail car, the combination of a body providing a covered enclosure with a floor, said body having side openings at the ends of the car; and trucks having tandem wheels and individually swiveled on the body on vertical axes at each side of the car body, the floor level of the body being below the tops of the peripheral supporting surfaces of the wheels and said body being provided with main supporting longitudinal beams arranged outside of the trucks and spanning the space longitudinally between the trucks.

5. In a rail car, the combination of a body providing a covered enclosure with a floor; trucks having tandem wheels and individually swiveled on the body on vertical axes at each side of the car body, the body sustaining at least the major portion of the side thrust on the trucks and rubber insulating each truck as a unit from the car body.

6. In a rail car, the combination of a body providing a covered enclosure with a floor; trucks having tandem wheels and individually swiveled on the body on vertical axes at each side of the car body; and rubber interposed between each truck as a unit and the car individually springing each truck, the body sustaining at least the major portion of the side thrust on the trucks.

7. In a rail car, the combination of a body providing a covered enclosure with a floor; trucks having tandem wheel and individually swiveled on the body on vertical axes at each side of the car body; and rubber means individually springing each truck as a unit and insulating the truck from the body, the body sustaining at least the major portion of the side thrust on the trucks.

8. In a rail car, the combination of a body providing a covered enclosure with a floor; trucks having tandem wheels and individually swiveled on the car body on vertical axes at each side of the car body; a brake arm swingingly mounted on each truck on an axis parallel with the axes of the wheels of the truck; and a brake beam between brake arms pivotally connected to said arms with substantially vertically directed axes.

9. In a rail car, the combination of a covered enclosing body; individual trucks at each side of the car having tandem wheels, said trucks having rigid frames connecting the wheels; and rubber joints located between the wheels pivotally connecting the truck frames with the body.

10. In a rail car, the combination of a covered enclosing body; individual trucks at each side of the car having tandem wheels, said trucks having rigid frames connecting the wheels; and rubber joints located between the wheels connecting the truck frames pivotally on a horizontal axis with the body.

11. In a rail car, the combination of a body providing a covered enclosure with a floor, said body having side openings at the ends of the car; and trucks having tandem wheels and individually swiveled on the body on vertical axes at each side of the car body, the floor level of the body being below the tops of the peripheral supporting surfaces of the wheels and said body being provided with main supporting longitudinal beams arranged outside of the trucks and spanning the space longitudinally between the trucks, said longitudinal beams being arranged in the planes of the sides of the body.

12. In a rail car, the combination of a body providing a covered enclosure with a floor, said body having side openings at the ends of the car; and trucks having tandem wheels and individually swiveled on the body on vertical axes at each side of the car body, the floor level of the body being below the tops of the peripheral supporting surfaces of the wheels and said body being provided with main supporting longitudinal beams arranged outside of the trucks and spanning the space longitudinally between the trucks, said beams extending below the tops of the wheels.

13. In a rail car, the combination of a body providing a covered enclosure with a floor, said body having side openings at the ends of the car; and trucks having tandem wheels and individually swiveled on the body on vertical axes at each side of the car body, the floor level of the body being below the tops of the peripheral supporting surfaces of the wheels and said body being provided with main supporting longitudinal beams arranged outside of the trucks and spanning the space longitudinally between the trucks, said beams extending below and above the tops of the wheels.

14. In a rail car, the combination of a body providing an enclosure with a floor; trucks at each side of the car body having tandem wheels, the floor level of the body between the trucks laterally and longitudinally being below the peripheral supporting surfaces of the wheels; swivel connections between each truck and the car body, said connections having vertical axes and cylindrical walls; and means for individually springing each truck as a unit, said means being arranged concentrically with the swivel axes, and at least a portion of the springing means arranged within the walls.

15. In a rail car, the combination of a body providing a covered enclosure with a floor; trucks having tandem wheels, and individually swiveled on the body on vertical axes at the sides of the car body, the floor level of the body laterally and longitudinally between the trucks being below the wheel centers.

16. In a rail car, the combination of a body providing a covered enclosure with a floor; trucks having tandem wheels and individually swiveled on the body on vertical axes at the sides of the car body, the floor level between the trucks laterally and longitudinally being below the tops of the peripheral supporting surfaces of the wheels; and main longitudinal body supports at the sides of the car outside the trucks.

17. In a rail car, the combination of a body providing a covered enclosure with a floor; trucks having tandem wheels and individually swiveled on the body on vertical axes at the sides of the car body, the floor level between the trucks laterally and longitudinally being below the wheel centers; and main longitudinal body supports at the sides of the car outside the trucks.

18. In a rail car, the combination of a body providing a covered enclosure with a floor; trucks having tandem wheels, and individually swiveled on the body on vertical axes at each side of the car body as a unit, the floor level of the body between the trucks laterally and longitudinally being below the peripheral supporting surfaces of the wheels, the body sustaining at least the major side thrust on the trucks; and means for individually springing each truck.

19. In a rail car, the combination of a body providing a covered enclosure with a floor; trucks having tandem wheels, and individually swiveled on the body on vertical axes at each side of the car body as a unit, the floor level of the body between the trucks laterally and longitudinally being below the peripheral supporting surfaces of the wheels, the body sustaining at least the major side thrust on the trucks; and means for individually springing each truck, said means being arranged concentrically with the swivel axis.

20. In a rail car, the combination of a body providing a covered enclosure with a floor, trucks having tandem wheels and individually swiveled on the body on vertical axes at each side of the car body; and load carrying rubber means arranged between the body and each truck as a unit, the rubber of said rubber means projecting horizontally from its support and disposed to operate in shear, the means sustaining at least the major portion of the side thrust on the trucks.

21. In a rail car, the combination of a body providing a covered enclosure with a floor; trucks having tandem wheels and individually swiveled on the body on vertical axes at each side of the car body; and a vertically disposed load carrying rubber bushing disposed to operate in shear having a vertical axis arranged at the swivel axis of each truck as a unit.

22. In a rail car, the combination of a body providing a covered enclosure with a floor; trucks having tandem wheels and individually swiveled on the car body on vertical axes at each side of the car body; and a vertically disposed load carrying rubber bushing disposed to operate in shear having a vertical axis arranged at the swivel axis of each truck, and said bushing sustaining at least the major portion of the side thrust on the truck.

23. In a rail car, the combination of a body providing a covered enclosure with a floor; trucks having tandem wheels and individually swiveled on the car body on vertical axes at each side of the car body; and load carrying rubber bushings disposed to operate in shear having vertical axes arranged in tandem and at the axis of the swivel of each truck.

24. In a rail car, the combination of a body providing a covered enclosure with a floor; trucks having tandem wheels and individually swiveled on the car body on vertical axes at each side of the car body; and a means sustaining the body load on the trucks comprising load carrying rubber bushings disposed to operate in shear arranged vertically at the axis of the swivel of each truck as units, said bushings being free to yield to accommodate the pivoting of the trucks, the bushings sustaining at least the major portion of the side thrust on the trucks.

25. In a rail car, the combination of a body providing a covered enclosure with a floor; trucks having tandem wheels and individually swiveled on the car body on vertical axes at each side of the car body; and means sustaining the body load on the trucks comprising load carrying rubber bushings disposed to operate in shear having vertical axes arranged in tandem and at the axis of the swivel of each truck, said bushings being free to yield to accommodate the pivoting of the truck.

26. In a rail car, the combination of a body providing a covered enclosure with a floor; trucks having tandem wheels and individually swiveled on the car body on vertical axes at each side of the car body; a vertically disposed load carrying rubber bushing having a vertical axis arranged at the swivel axis of each truck; and a driving connection extending from a wheel on the truck through the bushing.

27. In a rail car, the combination of a body providing a covered enclosure with a floor; trucks having tandem wheels and individually swiveled on the car body on vertical axes at each side of the car body; a vertically disposed load carrying rubber bushing arranged at the swivel axis of each truck; and a driving connection extending from a wheel on the truck through the bushing to an electric device mounted on the bushing.

HUGH C. LORD.